UNITED STATES PATENT OFFICE.

GUSTAVE JOHN LEMMENS, OF WATERINGBURY, AND PERCIVAL JOHN FRYER, OF TUNBRIDGE, ENGLAND.

INSECTICIDE, SHEEP-DIP, AND THE LIKE.

1,242,954.   Specification of Letters Patent.   Patented Oct. 16, 1917.

No Drawing.   Application filed January 16, 1917.   Serial No. 142,738.

*To all whom it may concern:*

Be it known that we, GUSTAVE JOHN LEMMENS, and PERCIVAL JOHN FRYER, both subjects of the King of Great Britain and Ireland, residing, respectively, at Wateringbury, Kent, England, and Tunbridge, Kent, England, have invented new and useful Improvements Relating to Insecticides, Sheep-Dip, and the like, of which the following is a specification.

This invention has reference to the improved insecticides, sheep dip and the like described in a specification of even date herewith, and has for its object to provide the improved material in a ready and convenient form for use.

In the specification aforesaid provision is made for extracting the organic salt or salts, compound or compounds (hereinafter termed compound) from the seeds, leaves (and other portions of the plant) of the species and varieties of the genus of plants known as *Tephrosia* of the natural order *Leguminosæ* and the suborder *Papilionaceæ*, also called igongo and other local names, before the said compound is mixed with any carrying agents, diluents or other substances to form the finished product ready for use.

In the manufacture of a sheep dip, in accordance with the present invention, the seeds, leaves and other portions of the plants, before referred to, are ground to powder and if desired mixed with other ingredients. Likewise, in the manufacture of an insecticide for use for the destruction of plant pests, the ground material may be mixed with soap, sulfur or other substances.

The said ground material may also be mixed with various other substances to form preparations for the destruction of earth worms, grubs and the like.

The compound contained within the material is extractable therefrom, when in a finely divided state, by moisture or by immersing the material in water. The said compound when extracted then mixes with the substances which may be added to the ground material to produce the desired finished product ready for use for dipping or spraying.

The ground material may have suitable softening reagents added thereto for softening the water into which the material may be placed. Likewise suitable antiseptics or bacteriacides may be added thereto. An advantage of the above anti-parasitic mixture is that it is harmless to plants or large animals.

What we claim is:—

1. A parasiticidal preparation comprising comminuted parts of *Tephrosia* and a soap vehicle.

2. A parasiticidal preparation comprising comminuted parts of *Tephrosia* and a sulfur soap vehicle.

Dated this 13th day of December, 1916.

GUSTAVE JOHN LEMMENS.
PERCIVAL JOHN FRYER.